No. 658,348. Patented Sept. 25, 1900.
W. F. CROWLEY.
SEED PLANTER.
(Application filed June 15, 1900.)
(No Model.)
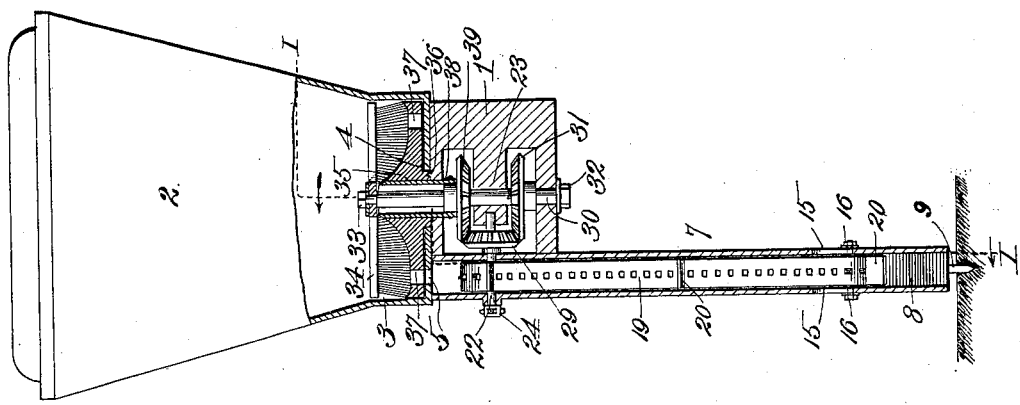
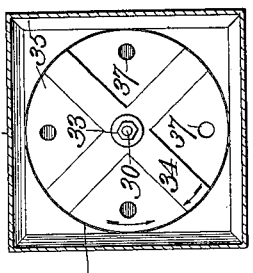
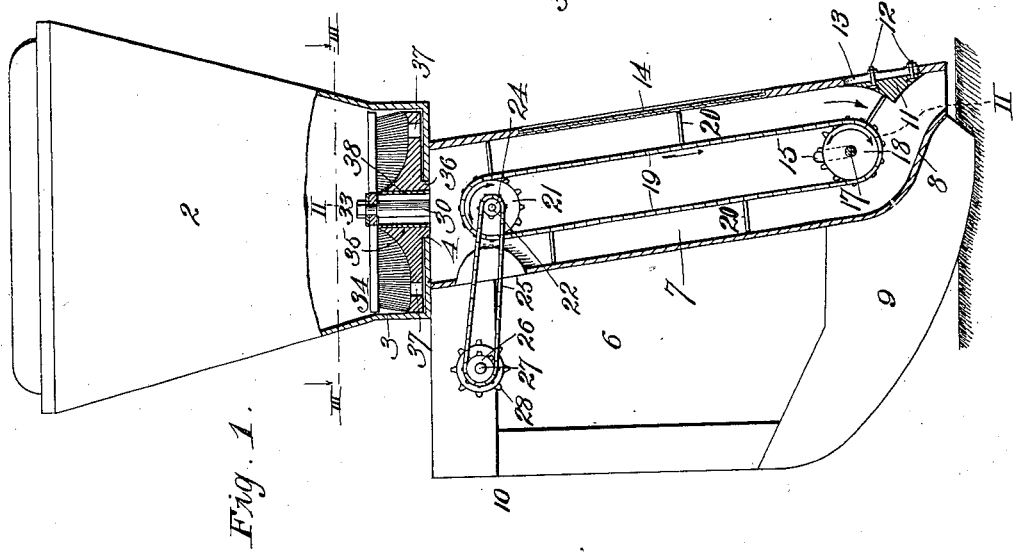
Witnesses:
H. C. Rodgers
A. H. Cooper
Inventor:
W. F. Crowley
By Fischer + Shope
Attys.
THE NORRIS PETERS CO., PHOTO-LITHO., WASHINGTON, D. C.

UNITED STATES PATENT OFFICE.

WILLIAM F. CROWLEY, OF HOLLY, COLORADO.

SEED-PLANTER.

SPECIFICATION forming part of Letters Patent No. 658,348, dated September 25, 1900.

Application filed June 15, 1900. Serial No. 20,389. (No model.)

*To all whom it may concern:*

Be it known that I, WILLIAM F. CROWLEY, a citizen of the United States, residing at Holly, Prowers county, Colorado, have invented a new and useful Seed-Planter, of which the following is a specification.

My invention relates to seed-planters; and the primary objects are to provide a seed-planter whereby seed can be planted closely in bunches at any desired distance apart; second, by which the hills may be made more or less elongated or scattered; third, by which the discharge of the seed is forced and even; fourth, by which the operator can tell the quantity of seed being dropped; fifth, which can be used at will as a hill dropping or drilling planter, and, sixth, which is efficient in operation and simple, strong, durable, and cheap of construction.

To these purposes the invention consists in certain novel and peculiar features of construction and combinations of parts, as will be hereinafter described and claimed, and in order that the invention may be fully understood reference is to be had to the accompanying drawings, in which—

Figure 1 is a vertical section taken on the line I I of Fig. 2. Fig. 2 is a vertical section taken on the line II II of Fig. 1. Fig. 3 is a horizontal section taken on the line III III of Fig. 1.

Referring to the drawings, 1 is a frame for supporting the seed-planting mechanism, said frame forming a part of the seed-planter (not shown) of the usual or any preferred construction. 2 is a seed box or hopper mounted upon said frame and having its lower end of cylindrical form, as at 3, and its bottom provided with a circular hole or opening 4 in its center and near one side with a hole 5.

6 designates the shoe for opening the furrow for the seed, the same comprising the hollow boot or leg 7, arranged vertically under the hole 5 of the seedbox-bottom and sloping rearward slightly, with its front wall bent or curved rearward at a greater angle, as at 8, to provide a small discharge-opening at the rear or heel end of the boot, the runner 9 projecting downward and underlying the part 8 of the shoe and the angle-arm 10 connecting the front end of the runner with the upper part of the boot or leg.

11 designates a substantially-triangular block secured adjustably within the boot or leg at its front end and rear side by means of bolts 12, extending through the vertical slot 13 of the rear wall of the boot or leg, and above said slot 13 the boot or leg is provided with a transparent wall or window 14, through which, as will be hereinafter explained, the quantity of grain dropped may be observed. The side walls of the boot or leg are vertically slotted, as at 15, and adjustably secured therein by nuts 16 is a bolt or shaft 17, and vertically above said shaft and arranged about concentrically with the upper side of adjustable block 11 is a sprocket-wheel 18.

A sprocket-chain 19, provided with a series of equidistant valves or arms 20, extends longitudinally within the boot or leg and engages sprocket-wheel 18 at one end and a corresponding sprocket-wheel 21 at its opposite or upper end, the arrangement being such that the arms or valves 20 form close partitions between the chain and the opposing sides of the boot or leg and the upper side of block 11, and thereby support and carry all seed dropped upon them until they successively clear block 11, movement being in the direction indicated by the arrow, Fig. 1. As they successively clear block 11 the grain is dropped in close bunches at regular distances apart, as will be readily seen, the distance apart, of course, being determined either by the distance between said arms or valves or by the speed with which the chain travels.

When it is desired to make the hills more or less elongated or scattered, block 11 is removed, so that as the lowest downward-moving arm or valve begins to turn around sprocket 18, and therefore diverge from the rear wall of the boot or leg, grain begins to drop and is obviously strung out more or less, according to the speed with which the chain is moving. An adjustment of sprocket-wheel 18 of course must be followed by a corresponding adjustment of block 11, if it is desired that the seed shall be closely planted in hills, and in this connection it will be noted that the sloping portion 8 at the lower end of the boot or leg and overlapping the runner 9 serves to limit the depth of the latter, and thereby insure the deposit of the seed at a uniform depth without clogging at the heel of the shoe.

The shaft 22, upon which sprocket-wheel 21 is secured, is journaled in the side walls of the boot or leg and in a central arm 23 of frame 1, and secured upon one end outward of the boot or leg is a small sprocket-wheel 24, connected by a chain 25 with the sprocket-wheel 26, secured upon a short shaft 27, journaled in angle-arm 10, said shaft being also provided with a sprocket-wheel 28, driven by a chain, (not shown;) but shaft 27 may be operated in any other suitable manner.

Secured upon the inner end of shaft 22 is a bevel-gear 29, meshing with a bevel-gear 31, secured upon the vertical threaded shaft 30, journaled in the frame and engaged at its lower end by nut 32 and at its upper end by nut 33, the latter being utilized to clamp rigid upon the upper end of said shaft the plural-armed brush 34.

35 is a substantially-conical plate interposed between the brush and the bottom of the seed-box and having its hub 36 journaled in the hole 4 of the box, and said plate is provided near its periphery with a plurality of holes 37, adapted once in each revolution to successively register with the hole 5, opening into the boot or leg 7, one of the brush-arms being arranged to close or cover the upper end of said registering hole 37 in order to force the seed positively down through hole 5 and insure the dropping of an equal quantity of seed in each hill by limiting each discharge through plate 35 to the capacity of one of the holes 37 of said plate. Said plate in cross-section is of conical form to insure regularity in the dropping action irrespective of the quantity of seed in the box.

The seed-dropping plate is mounted rigidly on the sleeve 38, extending down through the upper part of frame 1 and secured rigidly to the bevel-gear 39, journaled on shaft 30 and meshing with gear-pinion 29, said gear-wheel 39 being of the same size as wheel 31 in order that it shall rotate at equal speed with the latter, but in the opposite direction, the parts being so arranged that the brush-arms 34 cover holes 37 at the moment one of the latter registers with discharge-hole 5.

In practice as the machine proceeds across the field shaft 27 is rotated to impart movement to chain 19 in the direction indicated by the arrow, Fig. 1, and movement in opposite directions is imparted from shaft 22 to the dropping-plate 35 and brush 34, with the seed-dropping mechanism operating at such speed that a charge of seed is dropped through hole 5 upon each arm or valve 21 of the chain, and the gearing by preference is so proportioned that at each revolution of shaft 22 the chain moves a sufficient distance to deposit the load carried by the undermost descending arm or valve in the bottom of the furrow at the same time another load is dropped on another valve or arm, so that there are always about three charges or loads on a corresponding number of arms or valves on the way to the point of discharge, which as they pass the transparent window 14 are under the observation of the operator, who can therefore tell just how much grain is being deposited in each hill. If it be desired to transform this machine into the regular drill, the chain 19 is removed and a suitable gearing employed to drop the grain as fast as wanted.

It is obvious that the machine can be used with equal facility and with equal accuracy in planting small or large seed and that to change the distance of the hills in planting it is only necessary to increase the speed of shaft 22. To change or limit the amount of seed deposited in each hill, the plate 35 should be exchanged for one with different-sized holes.

This planting mechanism can be employed upon an automobile agricultural machine or upon a horse-power machine and of course can be set in any desired relation. It is especially valuable for planting sugar-beets, ordinarily planted in thick drills.

From the above description it will be apparent that I have produced a seed-planter embodying the features of advantage enumerated as desirable in the statement of invention. Various changes as regards the exact form or proportion of the parts may be made without departing from the spirit and scope or sacrificing any of the advantages of the invention.

Having thus described the invention, what I claim as new, and desire to secure by Letters Patent, is—

1. A seed-planter, comprising a frame, a seedbox carried by said frame and provided with a discharge-hole, a shoe having a hollow boot or leg registering at its upper end with said hole, a plate rotating in the bottom of the seedbox and provided with a hole registering with the seedbox-hole once in each revolution, and a brush rotating upon said plate in the opposite direction and acting as a cover for the plate-hole at the moment the latter registers with the seedbox-hole, substantially as described.

2. A seed-planter, comprising a frame, a seedbox carried by said frame and provided with a discharge-hole, a shoe having a hollow boot or leg registering at its upper end with said hole, a shaft projecting up into the seedbox, a brush mounted upon said shaft within the seedbox, a plate suitably journaled and surrounding said shaft and interposed between the brush and the bottom of the seedbox, and provided with a hole adapted to register once in each revolution with the seedbox-hole, and means to impart movement in opposite directions but at equal speed to said shaft and said plate, substantially as described.

3. A seed-planter, comprising a frame, a seedbox carried by said frame and provided with a discharge-hole, a shoe having a hollow boot or leg registering at its upper end with said hole, a shaft projecting up into the seedbox, a brush mounted upon the upper end of the shaft, a gear-wheel secured upon the latter near its lower end, a gear-wheel journaled upon said shaft, a perforated seed-dropping plate connected rigidly to the last-named gear-wheel, and a shaft suitably driven and provided with a pinion meshing with said gear-wheels, substantially as described.

4. A seed-planter, comprising a frame, a seedbox carried by said frame and provided with a discharge-hole, a shoe having a hollow boot or leg registering at its upper end with said hole, a shaft projecting up into the seedbox, a brush mounted upon the upper end of the shaft, a gear-wheel secured upon the latter near its lower end, a gear-wheel journaled upon said shaft, a perforated seed-dropping plate connected rigidly to the last-named gear-wheel, a shaft provided with a pinion meshing with said gear-wheels, and with a sprocket-wheel, a shaft suitably driven, a sprocket-wheel thereon, and a chain connecting said sprocket-wheels, substantially as described.

5. In a seed-planter, a frame, a seed-hopper carried thereby and provided with a discharge-hole, means for effecting the discharge of seed through said hole at regular intervals, a shoe having a hollow boot or leg registering at its upper end with said hole, and having the lower end of its front wall sloping downward and rearward to provide a discharge-opening at the lower end of the boot or leg, a driven sprocket-wheel in the upper end of the boot or leg, an adjustable sprocket-wheel in the lower end of the boot or leg, a conveyer connecting said sprocket-wheels and provided with a plurality of arms or valves projecting outward and forming partitions between the conveyer and the boot or leg, and a movable block secured in the lower end of the boot or leg over the discharge-opening thereof and having its upper side substantially concentric with the lower sprocket-wheel, substantially as described.

In testimony whereof I affix my signature in the presence of two witnesses.

WILLIAM F. CROWLEY.

Witnesses:
H. L. JOHNSON,
C. L. McPHERSON.